US008897503B2

(12) United States Patent
Corcoran et al.

(10) Patent No.: US 8,897,503 B2
(45) Date of Patent: *Nov. 25, 2014

(54) FACE RECOGNITION WITH COMBINED PCA-BASED DATASETS

(75) Inventors: Peter Corcoran, Claregalway (IE); Gabriel N. Costache, Galway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 553 days.

This patent is subject to a terminal disclaimer.

(21) Appl. No.: 13/230,768

(22) Filed: Sep. 12, 2011

(65) Prior Publication Data

US 2012/0230554 A1 Sep. 13, 2012

Related U.S. Application Data

(63) Continuation of application No. 12/418,987, filed on Apr. 6, 2009, now Pat. No. 8,050,466, which is a continuation of application No. 11/833,224, filed on Aug. 2, 2007, now Pat. No. 7,515,740.

(60) Provisional application No. 60/821,165, filed on Aug. 2, 2006.

(51) Int. Cl.
*G06K 9/00* (2006.01)
*G06K 9/62* (2006.01)

(52) U.S. Cl.
CPC .............. *G06K 9/6247* (2013.01); *G06K 9/629* (2013.01); *G06K 9/00275* (2013.01)
USPC .......................................... 382/118; 382/224

(58) Field of Classification Search
USPC .................................................. 382/118, 224
See application file for complete search history.

(56) References Cited

U.S. PATENT DOCUMENTS

| 5,500,671 | A | 3/1996 | Andersson et al. |
| 7,046,339 | B2 | 5/2006 | Stanton et al. |
| 7,218,759 | B1 | 5/2007 | Ho et al. |
| 7,315,631 | B1 | 1/2008 | Corcoran et al. |
| 7,515,740 | B2 * | 4/2009 | Corcoran et al. ............ 382/118 |

(Continued)

FOREIGN PATENT DOCUMENTS

| WO | 2007142621 A1 | 12/2007 |
| WO | 2008015586 A2 | 2/2008 |

(Continued)

OTHER PUBLICATIONS

PCT Notification of Transmittal of the International Search Report and the Written Opinion of the International Searching Authority, or the Declaration, for PCT Application No. PCT/IB2007/003985, dated Jun. 6, 2008, 20 pages.

(Continued)

*Primary Examiner* — John Strege

(57) ABSTRACT

A representation framework is determined in a face recognition method for a first collection of facial images including at least principle component analysis (PCA) features. A representation of said first collection is stored using the representation framework. A modified representation framework is determined based on statistical properties of original facial image samples of a second collection of facial images and the stored representation of the first collection. The first and second collections are combined without using original facial image samples. A representation of the combined image collection (super-collection) is stored using the modified representation framework.

7 Claims, 4 Drawing Sheets

(56) References Cited

U.S. PATENT DOCUMENTS

| | | | |
|---|---|---|---|
| 7,519,200 B2 | 4/2009 | Gokturk et al. | |
| 7,587,068 B1 | 9/2009 | Steinberg et al. | |
| 7,783,085 B2 | 8/2010 | Perlmutter et al. | |
| 7,995,855 B2 | 8/2011 | Albu et al. | |
| 8,050,466 B2 * | 11/2011 | Corcoran et al. | 382/118 |
| 8,155,468 B2 | 4/2012 | Albu et al. | |
| 8,189,927 B2 | 5/2012 | Steinberg et al. | |
| 8,265,399 B2 | 9/2012 | Steinberg et al. | |
| 8,363,951 B2 | 1/2013 | Steinberg et al. | |
| 8,363,952 B2 | 1/2013 | Steinberg et al. | |
| 2001/0031129 A1 | 10/2001 | Tajima | |
| 2002/0132663 A1 | 9/2002 | Cumbers | |
| 2003/0043160 A1 | 3/2003 | Elfving et al. | |
| 2003/0086593 A1 | 5/2003 | Liu et al. | |
| 2003/0118218 A1 | 6/2003 | Wendt et al. | |
| 2003/0128877 A1 | 7/2003 | Nicponski | |
| 2003/0133599 A1 | 7/2003 | Tian et al. | |
| 2003/0198368 A1 | 10/2003 | Kee | |
| 2004/0136574 A1 | 7/2004 | Kozakaya et al. | |
| 2004/0145660 A1 | 7/2004 | Kusaka | |
| 2004/0207722 A1 | 10/2004 | Koyama et al. | |
| 2004/0264780 A1 | 12/2004 | Zhang et al. | |
| 2005/0226509 A1 | 10/2005 | Maurer et al. | |
| 2006/0006077 A1 | 1/2006 | Mosher et al. | |
| 2006/0120599 A1 | 6/2006 | Steinberg et al. | |
| 2006/0140055 A1 | 6/2006 | Ehrsam et al. | |
| 2006/0140455 A1 | 6/2006 | Costache et al. | |
| 2006/0204053 A1 | 9/2006 | Mori et al. | |
| 2006/0248029 A1 | 11/2006 | Liu et al. | |
| 2007/0011651 A1 | 1/2007 | Wagner | |
| 2007/0031028 A1 | 2/2007 | Vetter et al. | |
| 2007/0053335 A1 | 3/2007 | Onyon et al. | |
| 2008/0089561 A1 | 4/2008 | Zhang | |
| 2008/0205712 A1 | 8/2008 | Ionita et al. | |
| 2009/0003661 A1 | 1/2009 | Ionita et al. | |
| 2010/0014721 A1 | 1/2010 | Steinberg et al. | |
| 2010/0066822 A1 | 3/2010 | Steinberg et al. | |
| 2010/0141786 A1 | 6/2010 | Bigioi et al. | |
| 2010/0141787 A1 | 6/2010 | Bigioi et al. | |
| 2012/0062761 A1 | 3/2012 | Ianculescu et al. | |
| 2012/0114198 A1 | 5/2012 | Yang et al. | |
| 2012/0207358 A1 | 8/2012 | Blonk et al. | |

FOREIGN PATENT DOCUMENTS

| | | |
|---|---|---|
| WO | WO2008107112 A2 | 9/2008 |
| WO | WO2008107112 A3 | 1/2009 |
| WO | WO2010063463 A2 | 6/2010 |
| WO | WO2010063463 A3 | 7/2010 |

OTHER PUBLICATIONS

Hall P., et al., Merging and Splitting Eigenspace Models, IEEE Transactions on Pattern Analysis and MachineIntelligence, IEEE Service Center, Los Alamitos, CA, US, vol. 22, No. 9, Sep. 1, 2000, pp. 1042-1049, XP008081056, ISSN: 0162-8828.

Hall, P., et al., Adding and subtracting eigenspaces with eigenvalue Decomposition and Singular Value Decomposition, Image and Vision Computing, Guildford, GB, vol. 20, No. 13-14, Dec. 1, 2002, pp. 1009-1016, XP008089613, ISSN: 0262-8856.

Hall, P., et al., Adding and Subtracting eigenspaces, Proceedings of the British Machine Vision Conference, XX, XX, vol. 2, Sep. 16, 1999, pp. 453-462, XP008089611.

B. Kusumoputro, et al., Development of 3D Face Databases by using Merging and Splitting Eigenspace Models, WSEAS Trans. on Computers, vol. 2, No. 1, 2003, pp. 203-209, XP008091807.

Liu, X., et al., Eigenspace updating for non-stationary Process and its application to face recognition, Pattern Recognition, Elsevier, GB, vol. 36. No. 9, Sep. 1, 2003, pp. 1945-1959, XP004429544, ISSN: 0031-3203.

Corcoran, Peter, et al., Automated sorting of consumer image collections using face and peripheral region image classifiers, IEEE Transactions on Consumer Electronics, IEEE Service Center, New York, NY, US, vol. 51, No. 3, Aug. 1, 2005, pp. 747-754, XP008089612, ISSN: 0098-3063.

Javier Melenchon, et al., Efficiently Downdating, Composing and Splitting Singular Value Decompositions Preserving the Mean Information, Pattern Recognition and Image Analysis Lecture Notes in Computer Science, LNCS, Springer Berlin Heidelberg, BE, vol. 4478, Jan. 1, 1900, pp. 436-443, XP019060614, ISBN: 978-3-540-72848-1.

Jun Zhang, et al., Face Recognition: Eigenface, Elastic Matching, and Neutral Nets, Proceedings of the IEEE, vol. 85, No. 9, Sep. 1997, p. 1423-1435.

Peter M. Hall, David Marshall, and Ralph R. Martin, Incremental Eigenanalysis for Classification, British Machine Vision Conference, p. 286-295, XP008091807.

Notice of Allowance, dated Jan. 16, 2013, for U.S. Appl. No. 12/631,733, filed Dec. 4, 2009.

Notice of Allowance, dated Feb. 4, 2013, for U.S. Appl. No. 12/554,258, filed Sep. 4, 2009.

Non-Final Rejection, dated Jan. 29, 2013, for U.S. Appl. No. 13/351,177, filed Jan. 16, 2012.

Final Rejection, dated Dec. 12, 2012, for U.S. Appl. No. 12/038,777, Feb. 27, 2008.

Notice of Allowance, dated Nov. 13, 2012, for U.S. Appl. No. 12/913,772, filed Oct. 28, 2010.

Notice of Allowance, dated Nov. 13, 2012, for U.S. Appl. No. 12/437,464, filed May 7, 2009.

Final Rejection, dated Sep. 28, 2012, for U.S. Appl. No. 12/631,711, filed Dec. 4, 2009.

Belle V., Detection and Recognition of Human Faces using Random Forests for a Mobile Robot, [Online] Apr. 2008, pp. 1-104, RWTH Aachen, DE Master of Science Thesis, [retrieved on Apr. 29, 2010], Retrieved from the Internet: URL:http://thomas.deselaers.de/teaching/fi les/belle_master.pdf> Section 5.7 Chapters 3-5.

Boom B., et al., Investigating the boosting framework for face recognition, Proceedings of the 28th Symposium on Information Theory in the Benelux, Enschede, The Netherlands, 2007, pp. 1-8.

Bourdev L., et al., "Robust Object Detection via Soft Cascade," In: Computer Vision and Pattern Recognition, IEEE Computer Society Conference on, Jun. 20, 2005 to Jun. 26, 2005 IEEE, Piscataway, NJ, USA, 2005, vol. 2, pp. 236-243.

Clippingdale S., et al., A unified approach to video face detection, tracking and recognition, Image Processing, Proceedings. 1999 International Conference on—Kobe, 1999, vol. 1, pp. 662-666.

Corcoran P., et al., Automatic System for In-Camera Person Indexing of Digital Image Collections, Conference Proceedings, GSPx 2006, Santa Clara, CA., Oct. 2006.

Costache G., et al., In-camera person-indexing of digital images, Consumer Electronics ICCE '06 Digest of Technical Papers. International Conference on, Jan. 7-11, 2006.

EPO Communication pursuant to Article 94(3) EPC, for European application No. 08716106.3, dated Jul. 2, 2010, 6 Pages.

Huang C., et al., Boosting Nested Cascade Detector for Multi View Face Detection, Proceeding, ICPR'04 Proceedings of the Pattern Recognition, 17 th International Conference on (ICPR'04), vol. 2, IEEE Computer Society Washington, DC, USA 2004, 4 pages.

Kouzani, A.Z., Illumination-Effects Compensation in Facial Images Systems, Man and Cybernetics, IEEE SMC '99 Conference Proceedings, 1999, pp. VI-840-VI-844, vol. 6.

Lienhart, R. et al., A Detector Tree of Boosted Classifiers for Real-Time Object Detection and Tracking, Proceedings of the 2003 International Conference on Multimedia and Expo, 2003, pp. 277-280, vol. 1, IEEE Computer Society.

Mitra, S. et al., Gaussian Mixture Models Based on the Frequency Spectra for Human Identification and Illumination Classification, Proceedings of the Fourth IEEE Workshop on Automatic Identification Advanced Technologies, 2005, pp. 245-250.

Rainer Lienhart, Chapter 6 Video OCR: A Survey and Practitioners Guide, Video Mining, Video mining by Azriel Rosenfeld, David Scott Doermann, Daniel Dementhon, Mining (Kluwer International Series in Video Computing), pp. 155-183, Springer, 2003, XP009046500.

Shakhnarovich G., et al., A unified learning framework for real time face detection and classification, Automatic Face and Gesture Rec-

(56) References Cited

OTHER PUBLICATIONS ognition, Proceedings. Fifth IEEE International Conference on, May 20, 2002 IEEE, Piscataway, NJ, USA, 2002, pp. 16-23.
Shakhnarovich G., et al., Chapter 7. Face Recognition in Subspaces, In: Handbook of Face Recognition, Li S.Z., et al. (Eds), 2005, Springer, New York, ISBN: 9780387405957, Section 2.1, pp. 141-168.
Sim T., et al., The CMU Pose, Illumination, and Expression (PIE) database, Automatic Face and Gesture Recognition, 2002, Proceedings, Fifth IEEE International Conference on, IEEE, Piscataway, NJ, USA, May 20, 2002, pp. 53-58, XP010949335, ISBN: 978-0-76.
Soriano, M. et al., Making Saturated Facial Images Useful Again, Proceedings of the SPIE, 1999, pp. 113-121, vol. 3826, XP002325961, ISSN: 0277-786X.
Wiskott L., et al., Face recognition by elastic bunch graph matching, Image Processing, Proceedings., International Conference on Santa Barbara, CA, USA, 1997, vol. 1, pp. 129-132.
PCT Notification of Transmittal of the International Search Report and Written Opinion of the International Searching Authority, or the Declaration, for PCT Application No. PCT/EP2009/008603, dated Jul. 6, 2010, 13 pages.
PCT International Preliminary Report on Patentability, for PCT Application No. PCT/EP2009/008603, dated Jun. 7, 2011, 9 pages.
PCT International Preliminary Report on Patentability for PCT Application No. PCT/IB2007/0003985, mailed on Feb. 3, 2009, 9 pages.
Final Office Action mailed Oct. 17, 2008 for U.S. Appl. No. 10/764,335, filed Jan. 22, 2004.
Final Office Action mailed Jun. 17, 2011 for U.S. Appl. No. 12/506,124, filed Jul. 20, 2009.
Non-Final Office Action mailed Oct. 11, 2011 for U.S. Appl. No. 12/437,464, filed May 7, 2009.
Non-Final Office Action mailed Oct. 11, 2011 for U.S. Appl. No. 12/913,772, filed Oct. 28, 2010.
Non-Final Office Action mailed Jul. 14, 2011 for U.S. Appl. No. 12/764,650, filed Apr. 21, 2010.
Non-Final Office Action mailed Mar. 14, 2007 for U.S. Appl. No. 10/764,335, filed Jan. 22, 2004.
Non-Final Office Action mailed Mar. 17, 2008 for U.S. Appl. No. 10/764,335, filed Jan. 22, 2004.
Notice of Allowance mailed Feb. 9, 2009 for U.S. Appl. No. 10/764,274, filed Jan. 22, 2004.
Notice of Allowance mailed Mar. 9, 2009 for U.S. Appl. No. 10/764,274, filed Jan. 22, 2004.
Notice of Allowance mailed Mar. 16, 2009 for U.S. Appl. No. 10/764,336, filed Jan. 22, 2004.
Notice of Allowance mailed Mar. 20, 2009 for U.S. Appl. No. 10/763,801, filed Jan. 22, 2004.
Notice of Allowance mailed Feb. 25, 2009 for U.S. Appl. No. 10/764,339, filed Jan. 22, 2004.
Notice of Allowance mailed Jan. 29, 2009 for U.S. Appl. No. 10/764,339, filed Jan. 22, 2004.
Notice of Allowance mailed Apr. 30, 2009 for U.S. Appl. No. 10/764,335, filed Jan. 22, 2004.
U.S. Appl. No. 13/230,768, filed Sep. 12, 2011, Office Action, Mar. 6, 2014.

* cited by examiner

FACE RECOGNITION WITH COMBINED PCA-BASED DATASETS

PRIORITY

This application is a Continuation of U.S. patent application Ser. No. 12/418,987, filed Apr. 6, 2009, now U.S. Pat. No. 8,050,466; which is a Continuation of U.S. patent application Ser. No. 11/833,224, filed Aug. 2, 2007, now U.S. Pat. No. 7,515,740; which claims the benefit of priority to U.S. provisional patent application Ser. No. 60/821,165, filed Aug. 2, 2006, which is hereby incorporated by reference.

BACKGROUND OF THE INVENTION

Face tracking technology has been recently introduced into consumer digital cameras enabling a new generation of user tools for the analysis and management of image collections (see, e.g., http://www.fotonation.com/index.php?module=company.news&id=39, wherein the entire site www.fotoination.com is incorporated by reference. In earlier research, it had been concluded that it should be practical to employ face similarity measures as a useful tool for sorting and managing personal image collections (see, e.g., P. Corcoran, G. Costache, Automated sorting of consumer image collections using face and peripheral region image classifiers, Consumer Electronics, IEEE Transactions on Volume 51, Issue 3, August 2005 Page(s):747-754; G. Costache, R. Mulryan, E. Steinberg, P. Corcoran, In-camera person-indexing of digital images Consumer Electronics, 2006, ICCE '06. 2006 Digest of Technical Papers, International Conference on 7-11 Jan. 2006 Page(s):2; and P. Corcoran, and G. Costache, Automatic System for In-Camera Person Indexing of Digital Image Collections, Conference Proceedings, GSPx 2006, Santa Clara, Calif., October 2006, which are all hereby incorporated by reference). The techniques described in this research rely on the use of a reference image collection as a training set for PCA based analysis of face regions.

For example, it has been observed that when images are added to such a collection there is no immediate requirement for retraining of the PCA basis vectors and that results remain self consistent as long as the number of new images added is not greater than, approximately 20% of the number in the original image collection. Conventional wisdom on PCA analysis would suggest that as the number of new images added to a collection increases to certain percentage that it becomes necessary to retrain and obtain a new set of basis vectors.

This retraining process is both time consuming and also invalidates any stored PCA-based data from images that were previously analyzed. It would be far more efficient if we could find a means to transform face region data between different basis sets.

In addition, it has been suggested that it is possible to combine training data from two or more image collections to determine a common set of basis vectors without a need to retrain from the original face data. This approach has been developed from use of the "mean face" of an image collection to determine the variation between two different image collections.

The mean face is computed as the average face across the members of an image collection. Other faces are measured relative to the mean face. Initially, the mean face was used to measure how much an image collection had changed when new images were added to that collection. If mean face variation does not exceed more than a small percentage, it can be assumed that there is no need to recompute the eigenvectors and to re-project the data into another eigenspace. If, however, the variation is significant between the two collections, then the basis vectors are instead re-trained, and a new set of fundamental eigenvectors should be obtained. For a large image collection, this is both time consuming and inefficient as stored eigenface data is lost. It is thus desired to have an alternative approach to a complete retraining which is both effective and efficient.

SUMMARY OF THE INVENTION

A face recognition method for working with two or more collections of facial images is provided. A representation framework is determined for a first collection of facial images including at least principle component analysis (PCA) features. A representation of said first collection is stored using the representation framework. A modified representation framework is determined based on statistical properties of original facial image samples of a second collection of facial images and the stored representation of the first collection. The first and second collections are combined without using original facial image samples. A representation of the combined image collection (super-collection) is stored using the modified representation framework. A representation of a current facial image, determined in terms of the modified representation framework, is compared with one or more representations of facial images of the combined collection. Based on the comparing, it is determined whether one or more of the facial images within the combined collection matches the current facial image.

The first collection may be updated by combining the first collection with a third collection by adding one or more new data samples to the first collection, e.g., according the further face recognition method described below.

Data samples of the first collection may be re-projected into a new eigenspace without using original facial images of the first collection. The re-projecting may instead use existing PCA features.

Training data may be combined from the first and second collections.

The method may be performed without using original data samples of the first collection.

The first and second collections may contain samples of different dimension. In this case, the method may include choosing a standard size of face region for the new collection, and re-sizing eigenvectors using interpolation to the standard size. The samples of different dimension may be analyzed using different standard sizes of face region.

The modified representation framework may be generated in accordance with the following:

$$C\hat{o}v_C = \frac{N^{C1}}{N^{C1}+N^{C2}}\left[\hat{E}^{C1} \times \hat{V}^{C1} \times \hat{E}^{C1^T}\right] + \frac{N^{C2}}{N^{C1}+N^{C2}}\left[\hat{E}^{C2} \times \hat{V}^{C2} \times \hat{E}^{C2^T}\right] + \frac{N^{C1}N^{C2}}{(N^{C1}+N^{C2})^2}[(Mean^{C1}-Mean^{C2})] \times [(Mean^{C1}-Mean^{C2})]^T$$

A further face recognition method for working with two or more collections of facial images is also provided. Different representation frameworks are determined for first and second collections of facial images each including at least principle component analysis (PCA) features. Different representations of the first and second collections are stored using the different representation frameworks. A modified representation framework is determined based on the different representations of the first and second collections, respectively. The first and second collections are combined without using original facial image samples. A representation of the combined image collection (super-collection) is stored using the modified representation framework. A representation of a current facial image, determined in terms of the modified representation framework, is compared with one or more representations of facial images of the combined collection. Based on the comparing, it is determined whether one or more of the facial images within the combined collection matches the current facial image.

The PCA features may be updated based on first eigenvectors and first sets of eigenvalues for each of the first and second collections. The updating may include calculating a new set of eigenvectors from the previously calculated first eigenvectors of the first and second collections.

The method may be performed without using original data samples of the first and second collections.

The first and second collections may contain samples of different dimension. A standard size of face region may be chosen for the new collection. Eigenvectors may be re-sized using interpolation to the standard size. The samples of different dimension may be analyzed using different standard sizes of face region.

The modified representation framework may be generated in accordance with the following:

$$\hat{Cov}_C = \frac{N^{C1}}{N^{C1} + N^{C2}} \left[ \hat{E}^{C1} \times \hat{V}^{C1} \times \hat{E}^{C1^T} \right] +$$
$$\frac{1}{N^{C1} + N^{C2}} \left[ (S^{C2} - Mean^{C2}) \times (S^{C2} - Mean^{C2})^T \right] +$$
$$\frac{N^{C1} N^{C2}}{(N^{C1} + N^{C2})^2} \left[ (Mean^{C1} - Mean^{C2}) \right] \times \left[ (Mean^{C1} - Mean^{C2}) \right]^T$$

One or more storage media may be provided having embodied therein program code for programming one or more processors to perform any of the methods described herein.

DETAILED DESCRIPTION OF THE EMBODIMENTS

Figure 1:
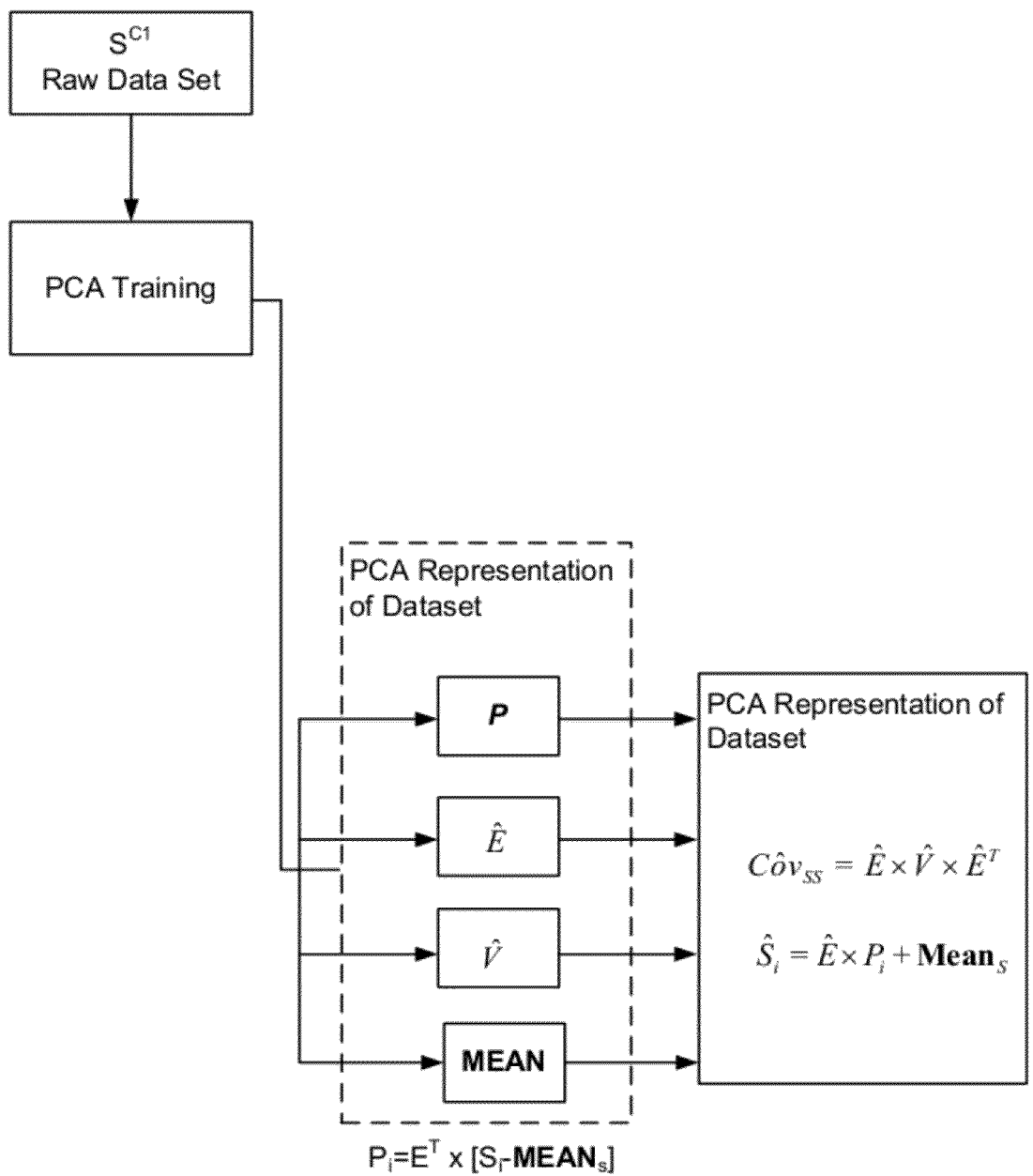
FIG. 1 illustrates the application of PCA to a raw dataset.

PCA analysis is a very common technique used signal processing for reducing data dimensions and in pattern recognition for feature extraction. The main disadvantage of the technique is that the resulted PCA features are data dependent which means that they have to be re-computed every time the data collection changes its format due to merging or splitting between multiple independent datasets or adding/deleting data samples from a given dataset. Embodiments of the invention are described below for combining multiple PCA datasets. Embodiment are also provided for updating one PCA dataset when data samples are changed using the old PCA values and the statistical properties of the PCA space of each dataset without using the original data values. This is very useful when the original data values are no longer available or when is not practical to re-use them for very large data collections.

Face recognition tasks are described for two cases. The first case is when it is desired to combine two face collections already analyzed using PCA without applying PCA analysis on the merged face collection. The second case is when it is desired to add new face samples to one collection already trained using PCA. The described methods are shown to yield at least similarly effective results as the classical approach of applying the PCA algorithm on the merged collection, while involving far less computational resources.

The techniques provided herein offer a significant saving in computational effort and are quite robust and offer high repeatability in the context of eigenface analysis. The algorithm of re-computing the new eigenspace is preferably similar to the approach described in Hall P., Marshalland D., and Martin R. "Adding and Subtracting Eigenspaces" British Machine Vision Conference, Vol 2, 1999, pp: 463-472; and Hall P., D. Marshall, and R. Martin. "Merging and splitting eigenspace models." PAMI, 22(9), 2000, pp: 1042-1048, which are each hereby incorporated by reference. The data samples may be re-projected into the new eigenspace without using the original data samples (the original faces), and instead using the old data projections (the old principal components).

A formal theoretical explanation of this method is provided below, and it is demonstrated that it is be broadly applicable to other applications when PCA based analysis is employed. A theoretical basis of principle component analysis as it is applied to eigenface analysis of face regions is next described. Preferred and alternative approaches to combining training data from multiple, previously-trained, datasets are then discussed. We next present the results of some experiments with image collections drawn from very different sources and demonstrate the practical results of applying our technique. Finally a description of the application of this technique in building practical tools and an application framework for the analysis, sorting and management of personal image collections is given.

Theory

Principal Component Analysis (PCA) is one of the most common approaches used in signal processing to reduce the dimensionality of problems where we need to deal with large collections of data samples. PCA is a linear transformation that maps the data to a new coordinate system so that the greatest variance across the data set comes to lie on the first coordinate or principal component, the second greatest variance on the second coordinate, and so on. These basis vectors represent the eigenvectors of the covariance matrix of the data samples and the coefficients for each data sample are the weights, or principal components of that data sample. Unlike other linear transformations, such as DCT, PCA does not have a fixed set of basis vectors. Its basis vectors depend on the data set.

PCA can be used for reducing dimensionality in a dataset while retaining those characteristics of the dataset that contribute most to its variance, by keeping lower-order principal components and ignoring higher-order ones. One of the advantages of PCA is that we need only compare the first 20 principle components out of a possible 1028 components where we use face regions of 32×32 pixel size. Calculating the distance between the principal components of two given data samples allows a measure of similarity between the two samples to be determined.

The basis vectors for PCA are not fixed, thus when new data samples are added to a data set there are issues as to the validity and applicability of the PCA method. In particular, two situations which may arise include the following:
(i) There are two collections of data which are already analyzed using PCA and it is desired to determine a common basis vector set for the combined collection and, ideally, transform the predetermined PCA descriptors without having to recalculate new descriptor sets for each item of data; and
(ii) There is an existing collection of data which is analyzed using PCA and it is desired to add a significant number of new raw data items to this dataset.

The classical solution for either of these cases is to recalculate the full covariance matrix of the new (combined) dataset and then recalculate the eigenvectors for this new covariance matrix. Computationally, however, this is not an effective solution, especially when dealing with large collections of data.

A different technique is provided herein to calculate the basis vectors, the eigenvalues and to determine the principle components for the new collection. The first eigenvector and the first set of eigenvalues are used from each collection in case (i), and preferably only these. The first eigenvector and the first set of eigenvalues from the original collection and the new data are used in case (ii). These have the advantages that the original data samples need not be saved in memory, and instead only the principle components of these samples are stored. Also, the new set of eigenvectors are calculated from the eigenvectors originally calculated for each collection of data. A detailed mathematical description of these techniques are provided below.

PCA Mathematical Model

To begin, assume a collection of N data samples $S_i$ with $i=\{1,N\}$. Each data sample is a vector of dimension m with m<N. The first step consists in changing the collection of data so that it will have a zeros mean, which is done by subtracting the mean of the data samples ($Mean_S=\Sigma S_i/N$) from each sample. The PCA algorithm consists in computing the covariance matrix $Cov_{SS}$ using eq. 1:

$$Cov_{SS} = \frac{1}{N}[S - Mean_S] \times [S - Mean_S]^T \quad (1)$$

The matrix S is formed by concatenating each data vector $S_i$. The size of the covariance matrix is equal to m×m and is independent of the number of data samples N. We can compute the eigenvector matrix $E=[e_1 \ e_2 \ \ldots \ e_m]$ where each eigenvector $e_i$ has the same dimension as the data samples m and the eigenvalues $[v_1 v_2 \ldots v_m]$ of the covariance matrix using eq 2:

$$Cov_{SS}=E \times V \times E^T \quad (2)$$

where the matrix V has all the eigenvalues on the diagonal and zeros in rest.

$$V = \begin{bmatrix} v_1 & 0 & \ldots & 0 \\ 0 & v2 & \ldots & 0 \\ \vdots & \vdots & \vdots & \vdots \\ 0 & 0 & \ldots & vm \end{bmatrix} \quad (3)$$

We can reconstruct each data samples using a linear combination of all eigenvectors using eq. 4.

$$S_i=E \times P_i+Mean_S \quad (4)$$

where $P_i$ represents the principal component coefficients for data sample $S_i$ and can be computed by projecting the data sample on the coordinates given by the eigenvectors using eq 5.

$$P_i=E^T \times [S_i-Mean_S] \quad (5)$$

By arranging the eigenvalues in descending order we can approximate the covariance matrix by keeping only a small number of eigenvectors corresponding to the largest values of the eigenvalues. The number of eigenvalues is usually determined by applying a threshold to the values, or maintaining the energy of the original data. If we keep the first n<m eigenvalues and their corresponding eigenvectors, the approximation of the covariance matrix can be computed as:

$$\hat{Cov}_{SS}=\hat{E} \times \hat{V} \times \hat{E}^T \quad (6)$$

with $V=[v_1 \ v_2 \ \ldots \ v_n]$

The data can be as well approximated using only the first n principal coefficients which correspond to the eigenvectors with largest variations inside the data collection.

$$\hat{S}_i=\hat{E} \times P_i+Mean_S \quad (7)$$

The standard results of applying PCA to a raw dataset are illustrated in FIG. 1.

Dataset Combination Scenarios

Let's assume that we have one collection of data $C^1$ which is analyzed using PCA algorithm which means we have its eigenvectors $E^{C1}=[e^{C1}_1 e^{C1}_2 \ldots e^{C1}_{n1}]$, the eigenvalues $[v^{C1}_1 v^{C1}_2 \ldots v^{C1}_{n1}]$, the PCA coefficients for each sample in the collection $Pc^{C1}$ and supplementary we also stored the mean data sample in the collection $Mean^{C1}$. We also can assume at this moment that the original data samples are no longer available for analysis or is not practical viable to access them again. This fact is important when working with very large datasets where it will be time consuming to re-read all datasamples for applying classical PCA or when working with temporary samples that can be deleted after they are first analyzed (e.g. when working with images for face recognition the user may delete some used to construct PCA based models).

Now we consider two different cases where the data in the collection will be changed:
(i) either a new collection of data which was already analyzed using PCA has to be added to the original collection in order to form a super-collection, or
(ii) a new set of raw (unanalyzed) data samples are to be added to the collection in order to update it.

Lets consider the first case of combination:

Combining Two Collections of PCA Data

Let's assume we want to combine collection $C^1$ described above with another collection of data $C^2$ also PCA analyzed with eigenvectors $E^{C2}=[e^{C2}_1 e^{C2}_2 \ldots e^{C2}_{n2}]$, eigenvalues $[v^{C2}_1 v^{C2}_2 \ldots v^{C2}_{n2}]$, the PCA coefficients $Pc^{C2}$ and the mean data sample $Mean^{C2}$. We want to combine the two collections into a super collection C without accessing the original data from the two collections $S^{C1}$ and $S^{C2}$ ($S^{C1}$ and $S^{C2}$ are data matrices where each column $S^{Ci}_j$ represented a vector data sample). The mean sample in the collection can be computed as:

$$\text{Mean} = \frac{N^{C1} * Mean^{C1} + N^{C2} * Mean^{C2}}{N^{C1} + N^{C2}} \quad (8)$$

where $N^{C1}$ and $N^{C2}$ represent the number of data samples in each collection. It is easy to prove [5] that the covariance of the super collection $Cov_C$ can be computed as:

$$Cov_C = \frac{1}{N^{C1} + N^{C2}} [(S^{C1} - \text{Mean})(S^{C2} - \text{Mean})] \times \quad (9)$$
$$[(S^{C1} - \text{Mean})(S^{C2} - \text{Mean})]^T =$$
$$\frac{1}{N^{C1} + N^{C2}} [(S^{C1} - Mean^{C1})] \times [(S^{C1} - Mean^{C1})]^T ++$$
$$\frac{1}{N^{C1} + N^{C2}} [(S^{C2} - Mean^{C2})] \times [(S^{C2} - Mean^{C2})]^T ++$$
$$\frac{1}{N^{C1} + N^{C2}} \frac{N^{C1} N^{C2}}{N^{C1} + N^{C2}} [(Mean^{C1} - Mean^{C2})] \times$$
$$[(Mean^{C1} - Mean^{C2})]^T =$$
$$\frac{N^{C1}}{N^{C1} + N^{C2}} Cov_{C1} + \frac{N^{C2}}{N^{C1} + N^{C2}} Cov_{C2} + + \frac{N^{C1} N^{C2}}{(N^{C1} + N^{C2})^2}$$
$$[(Mean^{C1} - Mean^{C2})] \times [(Mean^{C1} - Mean^{C2})]$$

As was stated above we cannot re-compute the covariance matrix using eq. 2 which requires all of the original data samples, in our case the original faces. There are two options: either we store the complete covariance matrices from the two collections and use them to compute the exact values of the covariance matrix of the supercollection or we can approximate each covariance matrix using the eigenvalues and eigenvectors from each individual collection, viz:

$$\hat{Cov}_C = \quad (10)$$
$$\frac{N^{C1}}{N^{C1} + N^{C2}} \left[ \hat{E}^{C1} \times \hat{V}^{C1} \times \hat{E}^{C1^T} \right] + \frac{N^{C2}}{N^{C1} + N^{C2}} \left[ \hat{E}^{C2} \times \hat{V}^{C2} \times \hat{E}^{C2^T} \right] +$$
$$\frac{N^{C1} N^{C2}}{(N^{C1} + N^{C2})^2} [(Mean^{C1} - Mean^{C2})] \times [(Mean^{C1} - Mean^{C2})]^T$$

If we assumed that from each collection the eigen decomposition (number of eigenvectors retained) was done so that the energy of the dataset is conserved we can assume (prove later in tests) that the face space given by eigen-decomposition of the covariance matrix of the super collection will be close to the estimated face space given by the eigen-decomposition of the estimated covariance matrix given by eq. 9.

In other words we have to show that the estimated eigenvectors and eigenvalues using the covariance matrix computed in eq 9 are close to the eigenvectors and eigenvalues computed applying classical PCA on the concatenated supercollection. Not all eigenvectors will be similar, only the ones corresponding to the highest variations in the datasets (with the largest corresponding eigenvalues).

Figure 2:
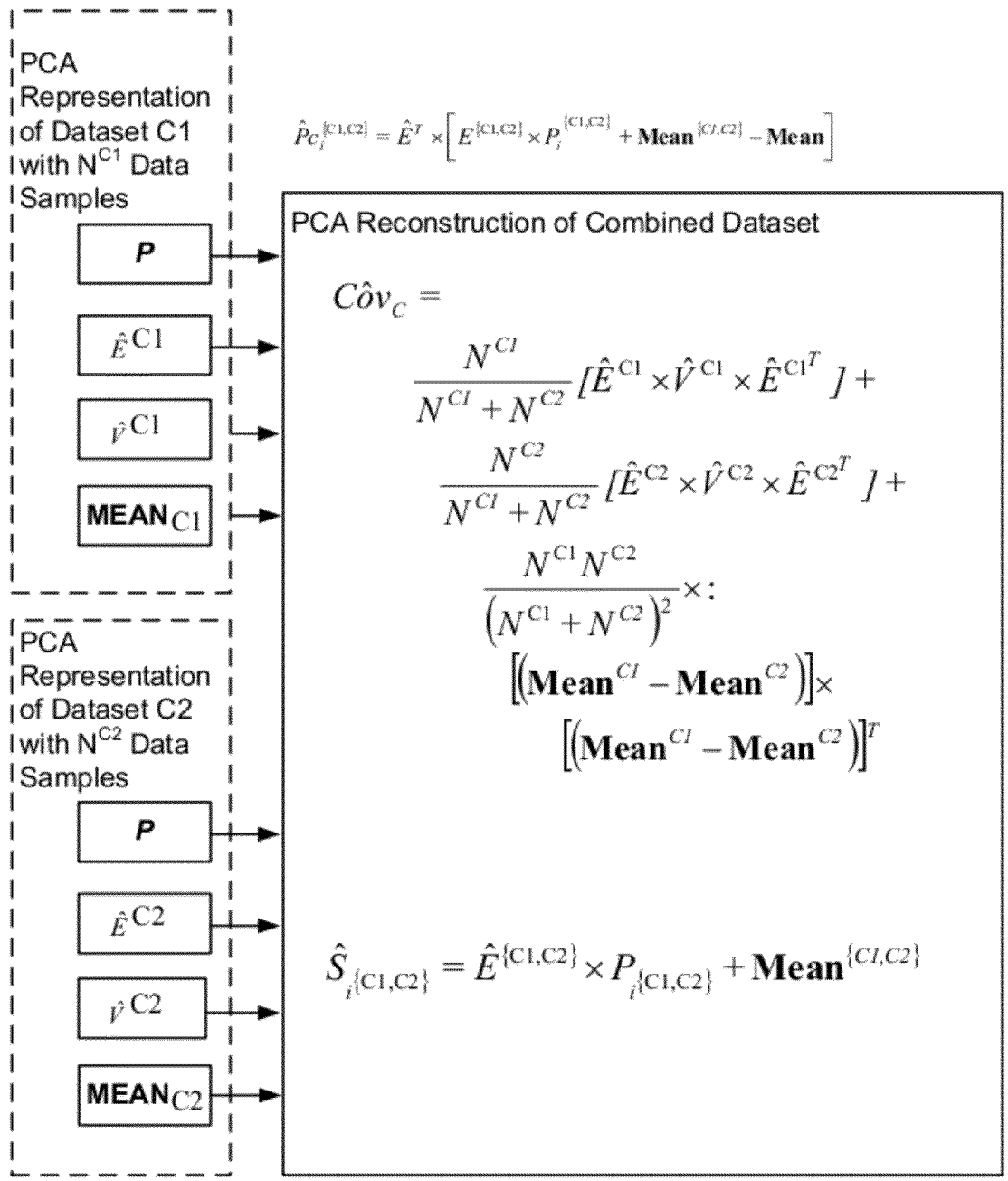
FIG. 2 illustrates the combining of two different PCA representations of datasets in accordance with a preferred embodiment.

The reconstruction of a combined dataset from two independently trained PCA data representations is illustrated in FIG. 2.

Another issue that may need to be addressed is the case where the two collections of data contain samples of different dimension. For example, in face recognition it might be necessary to combine two collections of faces that were analyzed using different standard sizes of face region. In this case we should choose a standard size of face region for the super collection (e.g. the minimum of the two sizes used), resizing using interpolation the eigenvectors of the combined collection to this standard size Once we have determined the covariance matrix of the super collection we can use the eigen decomposition again and compute the eigenvectors $E=[e_1 e_2 \ldots e_n]$ and the eigenvalues $V=[v_1 v_2 \ldots v_n]$ of the super collection. The number of eigenvalues kept for analysis n is independent of $n_1$ and $n_2$.

Once we have the eigenvectors we can project the data samples. Remember that we don't have the original data samples to project them easily so we have to re-create them from the old PCA coefficients. If we want to re-create a data sample we can use eq. 4. The result represents the data sample from which the mean data sample in collection 1 was subtracted so the exact value of the data sample is computed as:

$$\hat{S}_i\{C1,C2\} = \hat{E}^{\{C1,C2\}} \times P_i\{C1,C2\} + \text{Mean}^{\{C1,C2\}} \quad (11)$$

We have to subtract the mean of the super collection Mean (eq. 8) from this data sample. We can re estimate the Pc coefficients for each data sample in the super collection as:

$$\hat{P}_{C_i}\{C1,C2\} = \hat{E}^T \times [\hat{E}^{\{C1,C2\}} \times P_i^{\{C1,C2\}} + \text{Mean}^{\{C1,C2\}} - \text{Mean}] \quad (12)$$

In this case we assume that we have the collection of data $C^1$ described and we want to add new $N^{C2}$ data samples that are not analyzed already. The sample matrix is $S^{C2}$ and their mean value is $Mean^{C2}$. The new covariance matrix will be computed as:

$$\hat{Cov}_C = \frac{N^{C1}}{N^{C1} + N^{C2}} \left[ \hat{E}^{C1} \times \hat{V}^{C1} \times \hat{E}^{C1^T} \right] + + \quad (13)$$
$$\frac{1}{N^{C1} + N^{C2}} \left[ (S^{C2} - Mean^{C2}) \times (S^{C2} - Mean^{C2})^T \right] +$$
$$\frac{N^{C1} N^{C2}}{(N^{C1} + N^{C2})^2} [(Mean^{C1} - Mean^{C2})] \times [(Mean^{C1} - Mean^{C2})]^T$$

Applying the same algorithm as described in (1) we compute the new eigenvectors and eigenvalues. Using eq. 13 we can update the PCA coefficients of the initial collection and to compute the PCA coefficients of the new data samples we use:

$$\hat{P}_{C_i}^{C2} = \hat{E}^T \times [S_i^{C2} - \text{Mean}] \quad (14)$$

where the Mean matrix can be computed using eq. 8.

Figure 3:
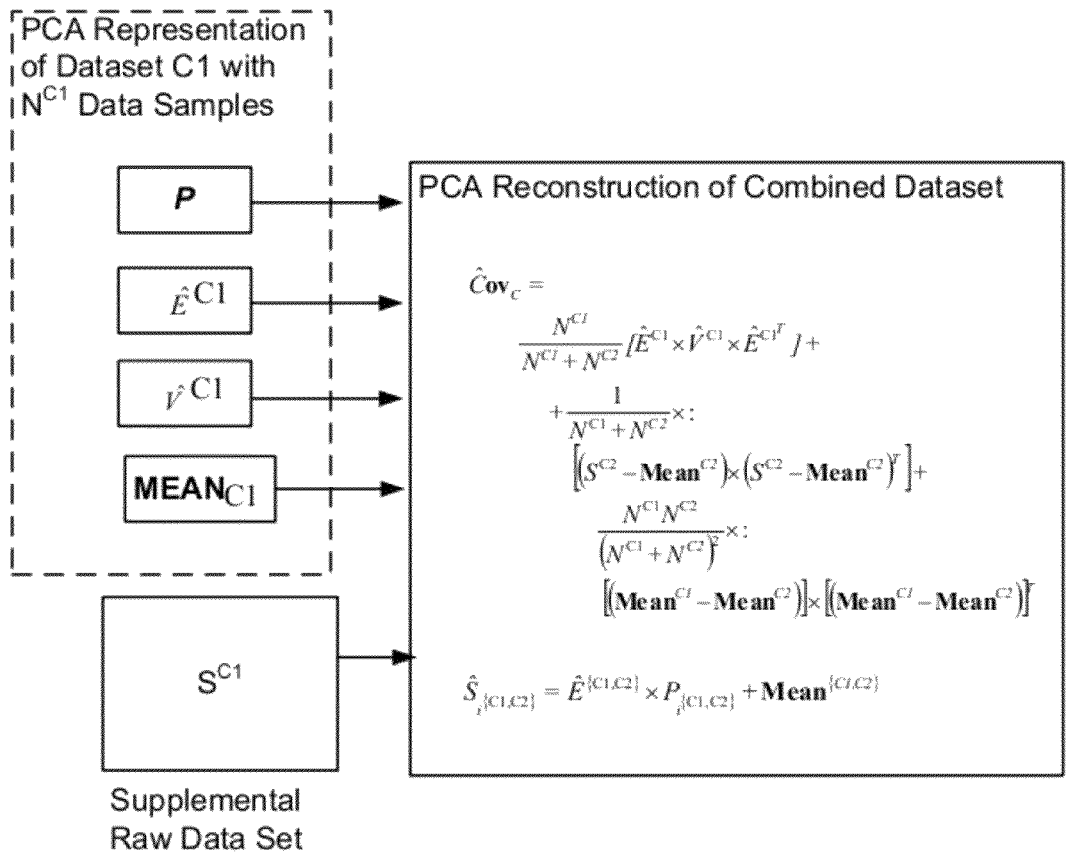
FIG. 3 illustrates the combining of PCA representations of datasets with supplemental raw data in accordance with a preferred embodiment.

This situation where additional raw data is added to a dataset with a (trained) PCA representation is illustrated in FIG. 3.

Experimental Results

We applied the method described in the previous section for our purpose: face recognition. We used an initial test collection of 560 faces (56 individuals each with 10 faces). The images are separated randomly into two datasets: the training dataset containing half of the faces and the remaining half were used as a testing dataset.

Two separate tests were performed by splitting the training faces into two collections with different number of faces. The faces were randomly attached to one of the initial collections:

1. Test A: we split the training collection into 2 collections each with 140 faces and performed classification tasks using three cases: simple concatenation of PCA coefficients without updating, classical combination using data samples and the proposed method.
2. Test B: using two collections one with 240 faces and the other with the remaining 40 faces in two cases: the classical approach and the proposed method. Also for this test we used both scenarios: combining two collections of PCA data and adding new data to a trained collection.

All faces were resized to 16×16 pixels, gray scale images were used and the number of PCA coefficients used in the classification stage was always 20. For classification the nearest neighbourhood method was preferred and the Euclidean distance between feature vectors was used.

Figure 4:
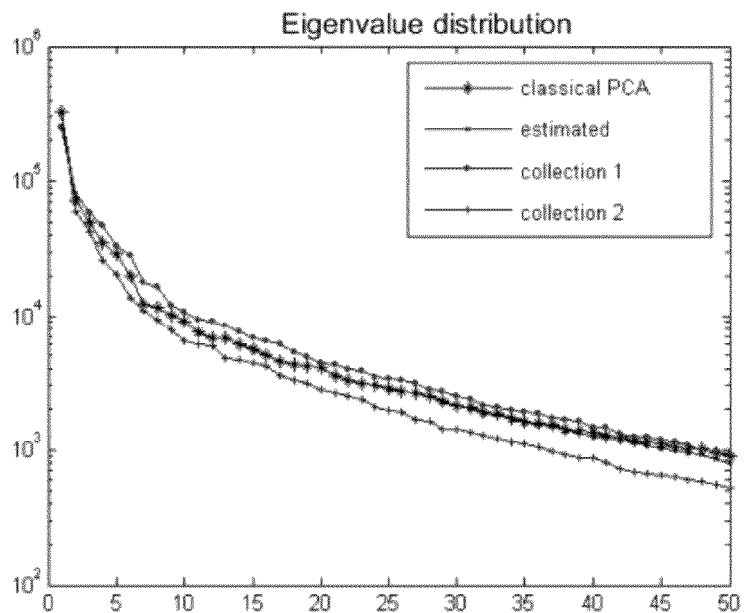
FIG. 4 shows several plots of eigenvalue distributions for both a first and a second collection for both the classical PCA method and a method in accordance with a preferred embodiment.
Figure 5A:
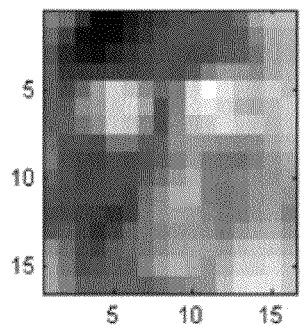
FIGS. 5a-5d illustrate first eigenfaces from both a first and a second collection for both the classical method and a method in accordance with a preferred embodiment.
Figure 5B:
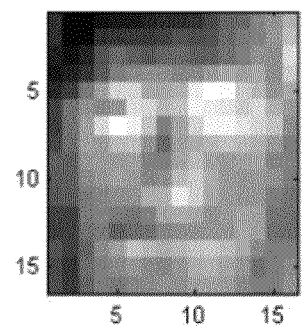
Figure 5C:
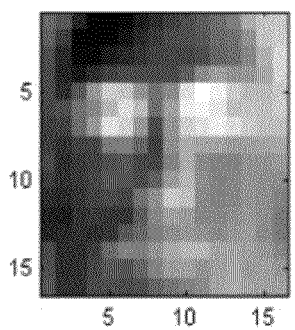
Figure 5D:
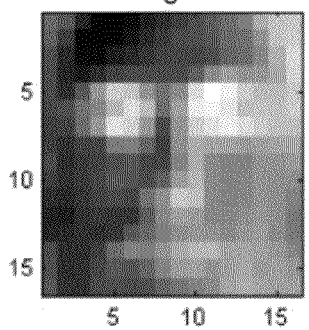

FIG. 4 represents the variation of the first 50 eigenvalues using the classical approach of combining two collections and the proposed method along with the eigenvalue variations inside the two separate collections. It can be noticed that the variations between the classical approach of combining the method and the proposed approach are very similar close to identical in the first part of the graph where the classical eigenvalues can not be noticed.

In order to see how the eigenvectors differ from the classical combination compared with the proposed method FIG. 2 shows the first eigenfaces from each collection along with the first eigenfaces obtained using the classical combination and the proposed method. It can be noted that the representation using the two methods have almost identical distributions.

It can be noted that the first eigenvector obtained applying the classical PCA over the combined collection is similar with the first eigenvector obtained using our approach and both of them are really different compared with the first eigenvector from each of the two sub-collections that we want to combine.

For Test A our second scenario is unlikely because the collections have the same number of samples so we tested only the first scenario: combining the two collections. The results are given in the first table.

TABLE 1

Recognition Rates for Test A

|  | Combining collections |
| --- | --- |
| Simple concatenation | 48.32% |
| Classical combination | 84.28% |
| Proposed method | 85.23% |

For Test B we used both scenarios: combining two collections (one having 240 data samples and the other having only 40 samples) and adding new sample to one collection. The results are given in Table 2.

TABLE 2

Recognition Rates for Test B

|  | Combining collections | Adding samples to collection |
| --- | --- | --- |
| Simple concatenation | 62.14% | Na |
| Classical combination | 84.28% | 84.28% |
| Proposed method | 84.64% | 83.14% |

It can be observed that in both tests the proposed combination method had the results very close to the classical approach of completely re-analyzing the newly combined collection using PCA. On the other hand, as expected, if the PCA coefficients are not updated after combination or the addition of multiple samples to the collection the recognition rate drops significantly. For our test case, adding 16% of new images to a collection produced more than a 20% decline in the recognition rate.

Techniques have been described for updating the PCA coefficients of data samples when the collection of data changes due to adding new data or combining two collections of data previously analyzed using PCA into a super collection. An advantage of the techniques is that they do not require that the original dataset is preserved in order to update its coefficients. This is very helpful when analyzing large collections of data and mandatory when the original data is lost. Another advantage is that the technique is much faster than the classical method or recomputing of the PCA coefficients using the original dataset, because the dimension of the PCA data is significantly smaller than the dimension of the original data, and one of the properties of the PCA algorithm is its dimensionality reduction. For example, if a face image raw data sample has 64×64 pixels, about 5 k of pixel data is used in storing it in order to keep that data sample. Now, if there are 100 faces, then 500 k of data space is involved. In a PCA representation, probably 20-30 basis vectors are used to describe each face. That means that 100 images can be stored using about 3000, or 3 k of data, which is more than 130 times less than storing the raw data samples. So, an advantage of the technique is that the original face images are not needed as the technique regenerates them from the PCA representation framework.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

All references cited above, as well as that which is described as background, the invention summary, the abstract, the brief description of the drawings and the drawings, are hereby incorporated by reference into the detailed description of the preferred embodiments as disclosing alternative embodiments.

We claim:
1. A consumer digital camera including a processor programmed by digital code to perform a face recognition method for working with two or more collections of facial images, wherein the method comprises:
   (a) determining distinct representation frameworks for first and second sets of facial regions extracted from corresponding image collections each framework including at least principle component analysis (PCA) features;

(b) storing representations of said first and second sets of facial regions using their respective representation frameworks;

(c) determining a third, distinct representation framework based on the representations of the first and second sets of facial regions;

(d) combining the stored representation of the first and the second sets of facial regions without using original facial image samples; including back-projecting the sets of facial regions into their respective representation frameworks, combining the two back-projected representations of these sets of facial regions into a combined dataset, and forward projecting the combined dataset into the third representation framework;

(e) storing a representation of the combined dataset using said third representation framework;

(f) comparing a representation of a current facial region, determined in terms of said third representation framework, with one or more representations of facial images of the combined dataset; and (g) based on the comparing, determining whether one or more of the facial images within the combined dataset matches the current facial image.

2. The consumer digital camera of claim 1, wherein the method further comprises updating the PCA features based on first eigenvectors and first sets of eigenvalues for each of the first and second sets of facial regions.

3. The consumer digital camera of claim 2, wherein the updating comprises calculating a new set of eigenvectors from the previously calculated first eigenvectors of the first and second sets of facial regions.

4. The consumer digital camera of claim 1, wherein the method does not use original data samples of the first and second sets of facial regions.

5. The consumer digital camera of claim 1, wherein the first and second sets of facial regions contain samples of different dimension, and the method further comprises:

(i) choosing a standard size of face region, and (ii) re-sizing eigenvectors using interpolation to the standard size.

6. The consumer digital camera of claim 5, wherein said samples of different dimension were analyzed using different standard sizes of face region.

7. The consumer digital camera of claim 1, wherein the method further comprises generating the third representation framework according to the following:

$$\hat{Cov}_C = \frac{N^{C1}}{N^{C1} + N^{C2}} \left[ \hat{E}^{C1} \times \hat{V}^{C1} \times \hat{E}^{C1^T} \right] ++$$
$$\frac{1}{N^{C1} + N^{C2}} \left[ (S^{C2} - Mean^{C2}) \times (S^{C2} - Mean^{C2})^T \right] +$$
$$\frac{N^{C1} N^{C2}}{(N^{C1} + N^{C2})^2} [(Mean^{C1} - Mean^{C2})] \times [(Mean^{C1} - Mean^{C2})]^T.$$

* * * * *